(12) United States Patent
Jain et al.

(10) Patent No.: US 10,042,405 B2
(45) Date of Patent: Aug. 7, 2018

(54) ADJUSTING SOURCE VOLTAGE BASED ON STORED INFORMATION

(71) Applicant: QUALCOMM Incorporated, San Diego, CA (US)

(72) Inventors: Palkesh Jain, Bangalore (IN); Manoj Mehrotra, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/920,218

(22) Filed: Oct. 22, 2015

(65) Prior Publication Data

US 2017/0115710 A1     Apr. 27, 2017

(51) Int. Cl.
| | |
|---|---|
| *G06F 1/00* | (2006.01) |
| *G06F 1/26* | (2006.01) |
| *G06F 1/32* | (2006.01) |
| *G06F 1/28* | (2006.01) |
| *H02J 7/00* | (2006.01) |

(52) U.S. Cl.
CPC ............ *G06F 1/26* (2013.01); *G06F 1/28* (2013.01); *G06F 1/32* (2013.01); *H02J 7/0063* (2013.01); *H02J 2007/0067* (2013.01)

(58) Field of Classification Search
CPC ...................................... G06F 1/32; G06F 1/26
See application file for complete search history.

(56) References Cited

U.S. PATENT DOCUMENTS

| | | | |
|---|---|---|---|
| 6,054,846 A | | 4/2000 | Castleman |
| 6,122,750 A | * | 9/2000 | Hayasaka .................. G06F 1/30 |
| | | | 702/187 |
| 7,075,276 B2 | | 7/2006 | Morales |
| 8,250,499 B2 | | 8/2012 | Chen et al. |
| 8,442,784 B1 | | 5/2013 | Read et al. |
| 8,689,021 B1 | * | 4/2014 | Bai ............................ G06F 1/28 |
| | | | 713/300 |
| 2003/0009702 A1 | * | 1/2003 | Park ........................ G06F 1/263 |
| | | | 713/300 |
| 2005/0120250 A1 | * | 6/2005 | Adachi ..................... G06F 1/26 |
| | | | 713/300 |
| 2006/0143583 A1 | * | 6/2006 | Diab ........................ G06F 1/189 |
| | | | 713/300 |
| 2006/0186858 A1 | | 8/2006 | Wang et al. |
| 2006/0192428 A1 | | 8/2006 | Ito |

(Continued)

OTHER PUBLICATIONS

International Search Report and Written Opinion—PCT/US2016/053120—ISA/EPO—dated Dec. 9, 2016.

*Primary Examiner* — Phil Nguyen (74) *Attorney, Agent, or Firm* — Arent Fox, LLP (57) ABSTRACT

Apparatuses and methods to adjust a source voltage based on stored information are provided. The apparatus includes a circuit configured to receive power from a power source through a power distribution network, a storage medium storing data specifying one or more electrical characteristics of the circuit, and a control circuit configured to adjust a source voltage at the power source based on the data stored in the storage medium. The method includes receiving power by a circuit from a power source through a power distribution network, reading data specifying one or more electrical characteristics of the circuit from a storage medium, and adjusting a source voltage at the power source based on the data stored in the storage medium.

16 Claims, 9 Drawing Sheets

(56) References Cited

U.S. PATENT DOCUMENTS

| | | | |
|---|---|---|---|
| 2009/0027034 A1* | 1/2009 | Sohnis | H05B 33/0848 323/318 |
| 2009/0210726 A1* | 8/2009 | Song | G06F 11/3006 713/300 |
| 2010/0037038 A1* | 2/2010 | Bieswanger | G06F 1/3203 712/220 |
| 2010/0146333 A1* | 6/2010 | Yong | G06F 1/305 714/14 |
| 2011/0018346 A1* | 1/2011 | Dixon | G06F 1/3203 307/39 |
| 2011/0037438 A1 | 2/2011 | Bhardwaj et al. | |
| 2012/0123995 A1* | 5/2012 | Boot | G01R 21/1333 706/54 |
| 2012/0290865 A1* | 11/2012 | Kansal | G06F 1/3203 713/340 |
| 2013/0117589 A1* | 5/2013 | Satyamoorthy | G06F 1/324 713/320 |
| 2013/0159734 A1 | 6/2013 | Pan | |
| 2014/0191734 A1 | 7/2014 | Kuang et al. | |
| 2015/0032278 A1* | 1/2015 | Bhageria | H02J 4/00 700/295 |
| 2016/0041762 A1* | 2/2016 | Kanno | G06F 3/0604 711/103 |

\* cited by examiner

ADJUSTING SOURCE VOLTAGE BASED ON STORED INFORMATION

BACKGROUND

Field

The disclosure relates generally to electronic circuits, in particular, to apparatuses and methods for adjusting source voltage based on stored information.

Background

Increasingly, providing operating voltages to integrated circuits (ICs) is becoming an issue. For example, wireless communication technologies and devices (e.g., cellular phones, tablets, laptops, etc.) have grown in popularity and use over the past several years. These electronic apparatuses have grown in complexity and now commonly include multiple processors (e.g., baseband processor and application processor) and other resources that allow the users to execute complex and power-intensive software applications (e.g., music players, web browsers, video streaming applications, etc.). To meet the increasing performance demand, these processors have increased in complexity and operate in frequencies in the gigahertz range. As a result, the operating voltages of the IC would need to meet the various demands.

The operating voltage may be provided by a source voltage at a power supply. The source voltage may be set at a voltage margin above an operating voltage threshold to account for design and process variations. An operating voltage threshold or $V_{MIN}$ may be a minimum voltage at which a circuit may operate satisfactorily for various requirements (e.g. speed, function, power, etc.).

However, if the source voltage (e.g., the voltage margin) is set high above the operating voltage requirement, additional power may be consumed unnecessarily. As a result, battery life may be shortened, and additional heat may be produced while operating these processors. Accordingly, one design challenge is to adjust source voltage (e.g., the voltage margin) to meet the operating voltage requirement without excessive voltage margin at the source voltage.

SUMMARY

Aspects of a method for adjusting a source voltage at a power source are provided. The method includes receiving power by a circuit from a power source through a power distribution network, reading data specifying one or more electrical characteristics of the circuit from a storage medium, and adjusting a source voltage at the power source based on the data stored in the storage medium.

Aspects of an apparatus are disclosed. The apparatus includes a circuit configured to receive power from a power source through a power distribution network, a storage medium storing data specifying one or more electrical characteristics of the circuit, and a control circuit configured to adjust a source voltage at the power source based on the data stored in the storage medium.

Aspects of another apparatus are provided. The apparatus includes a circuit configured to receive power through a first power distribution network and a storage medium storing data specifying one or more electrical characteristics of the circuit responsive to receiving power through a second power distribution network.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term "apparatus" shall be construed to include any integrated circuit or system, or any portion of an integrated circuit or system (e.g., modules, components, circuits, or the like residing in an integrated circuit or part of an integrated circuit). The term "apparatus" shall also be construed to include any intermediate product where an integrated circuit or system is combined with other integrated circuits or systems (e.g., a video card, a motherboard, a circuit board, etc.) or any end product (e.g., mobile phone, personal digital assistant (PDA), desktop computer, laptop computer, palm-sized computer, tablet computer, work station, game console, media player, computer based simulators, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. A reference to a signal may be referred to the underlying signal line (e.g., a metal line on an IC) carrying the signal. A reference to a resistor may likewise be used to refer to the resistance of said resistor.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatuses and methods for adjusting a source voltage based on operating voltage responses will be presented with respect to a circuit board incorporating a processor IC for wireless communication and/or to a wireless communication system incorporating the circuit board. However, as those skilled in the art will readily appreciate, the various aspects of source voltage adjustment presented throughout this disclosure and their numerous applications are not limited thereto. For example, the aspects presented may be applicable to ICs other than a processor and applicable to functions beyond wireless communication. Accordingly, all references to a specific application for the presented apparatus or method are intended only to illustrate exemplary aspects of the apparatus or method with the understanding that such aspects may have a wide differential of applications.

Figure 1:
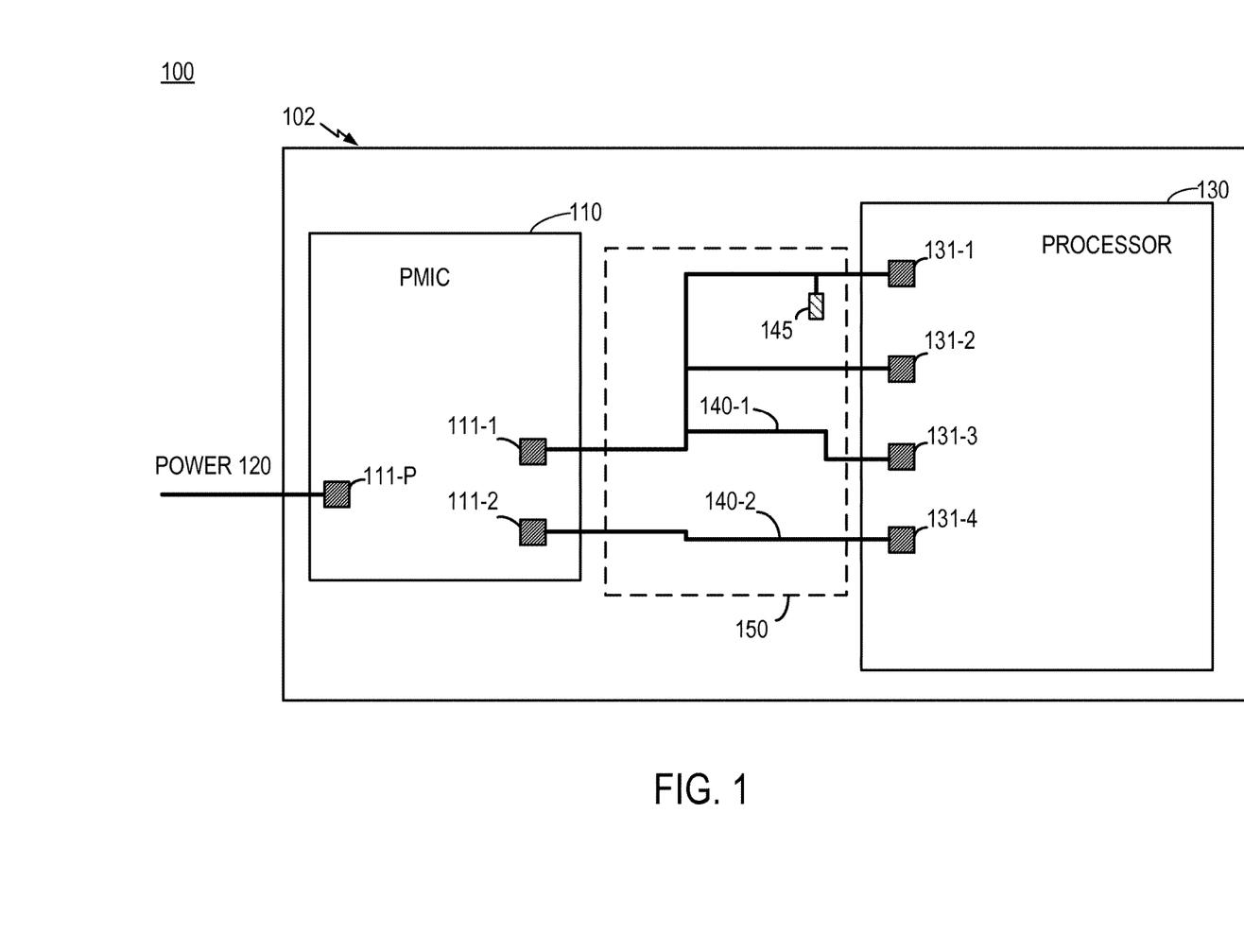
FIG. 1 is a diagram of an exemplary embodiment including a circuit receiving an operating voltage through a power distribution network.

FIG. 1 is a diagram 100 of an exemplary embodiment including a circuit receiving an operating voltage through a power distribution network. In some examples, the exemplary embodiment may include the various blocks of the processor 130 described below (e.g., the cores 132, the storage medium 190, the control circuit 136, etc.), the processor 130 incorporating those blocks, the board 102 incorporating the processor 130, or a device incorporating the board 102, etc.

The board 102 may be a circuit board for a wireless communication device, such as a cell phone. The board 102 may include a power source in the example of a power management IC (PMIC) 110 and a circuit in the example of a processor 130 or cores of the processor 130. The board 102 may further include a power distribution network (PDN) 150 through which the processor 130 receives operating voltage from the PMIC 110. In some examples, the PMIC 110 is on a semiconductor die or dies separate from the processor 130. In some examples, the PMIC 110 and the processor 130 are in separate packages.

The PMIC is configured to receive power 120 from, for example, a battery. The power 120 may be provided to a connector 111-P of the PMIC 110. In some examples, the connector 111 (e.g., 111-P, 111-1, 111-2) may be a metal bump on the package of the PMIC 110. The PMIC 110 may include connectors 111-1 and 111-2 to output a source voltage to other circuits, such as the processor 130 or circuits therein.

The processor 130 may be, for example, an application processor for the wireless communication device. The processor 130 may be on one or several substrates and may be within one or several packaged ICs. In some examples, the processor 130 may operate various subsystems, such as a camera unit, the modem, or a graphic processor unit of the wireless communication device. The processor 130 may include the connector 131 (e.g., 131-1-131-4) via which the operating voltage is received from the PMIC 110. In some examples, the connector 131 (e.g., 131-1-131-4) may be a metal bump on the package of the processor 130.

The connector 131 of the processor 130 is connected to the connector 111 of the PMIC 110 through the PDN 150. Thus, the processor 130 is configured to receive the operating voltage from the PMIC 110 through the PDN 150. The PDN 150 may include traces 140 (e.g., 140-1, 140-2) on the board 102 (e.g., a circuit board). Each of the traces 140 may include one or more metal layers and the interconnects thereof. Moreover, the PDN 150 may include electronic elements 145, such as capacitors or inductors, coupled to the traces 140. In some examples, the PDN 150 includes the metal traces and the electronic elements 145 on a board external to the semiconductor substrate of the PMIC 110 or the semiconductor substrate of the processor 130.

Under static conditions (e.g. director current or DC), the source voltage outputted by the PMIC 110 via the connector 111 may be the same as the operating voltage received by the processor 130 via the connector 131. However, under dynamic conditions (e.g., when the processor 130 is operating at a frequency), the source voltage outputted by the PMIC 110 may differ from the operating voltage received by the processor 130. The differences may be due in part to the various electrical characteristics of the PDN 150. Accordingly, the source voltage may be set or adjusted at a voltage margin above a threshold operating voltage of the processor 130.

In some examples, the voltage margin may account for the various electrical characteristics of the PDN 150. For example, the physical layout and other physical characteristics (e.g., lengths, numbers of metal layers) of the traces 140 of the PDN 150 may affect the operating voltages received by the processor 130. For example, the trace 140-1 of the PDN 150 connects a connector 111-1 of the PMIC 110 to three connectors (131-1-131-3) of the processor 130. The current load on the trace 140-1 may thus differ from the current load on the trace 140-2. Moreover, the different lengths of the traces 140-1 and 140-2 may result in difference inductances of the traces 140-1 and 140-2.

Thus, the operating voltage, received via the trace 140-1 and the connector 131-1, may differ from the operating voltage received via the trace 140-2 and the connector 131-4. Moreover, the PDNs 150 on different circuit boards (e.g., from different manufacturers) may differ. To account for all the varying electrical characteristics of the PDNs 150 and traces 140, the voltage margin (e.g., the source voltage outputted by the PMIC 110 incorporating the voltage margin) may be set higher than necessary. Current consumption and heat generation may both be higher as a result.

The present disclosure provides exemplary embodiments which adjust the source voltages at the power supply based on stored information. In some configurations, the disclosed exemplary embodiments set or adjust the source voltage (e.g., reduce voltage margin) based on certain electrical characteristics of, for example, the processor 130 powered through one or mode PDNs and produce current consumption and thermal management improvements.

Figure 2:
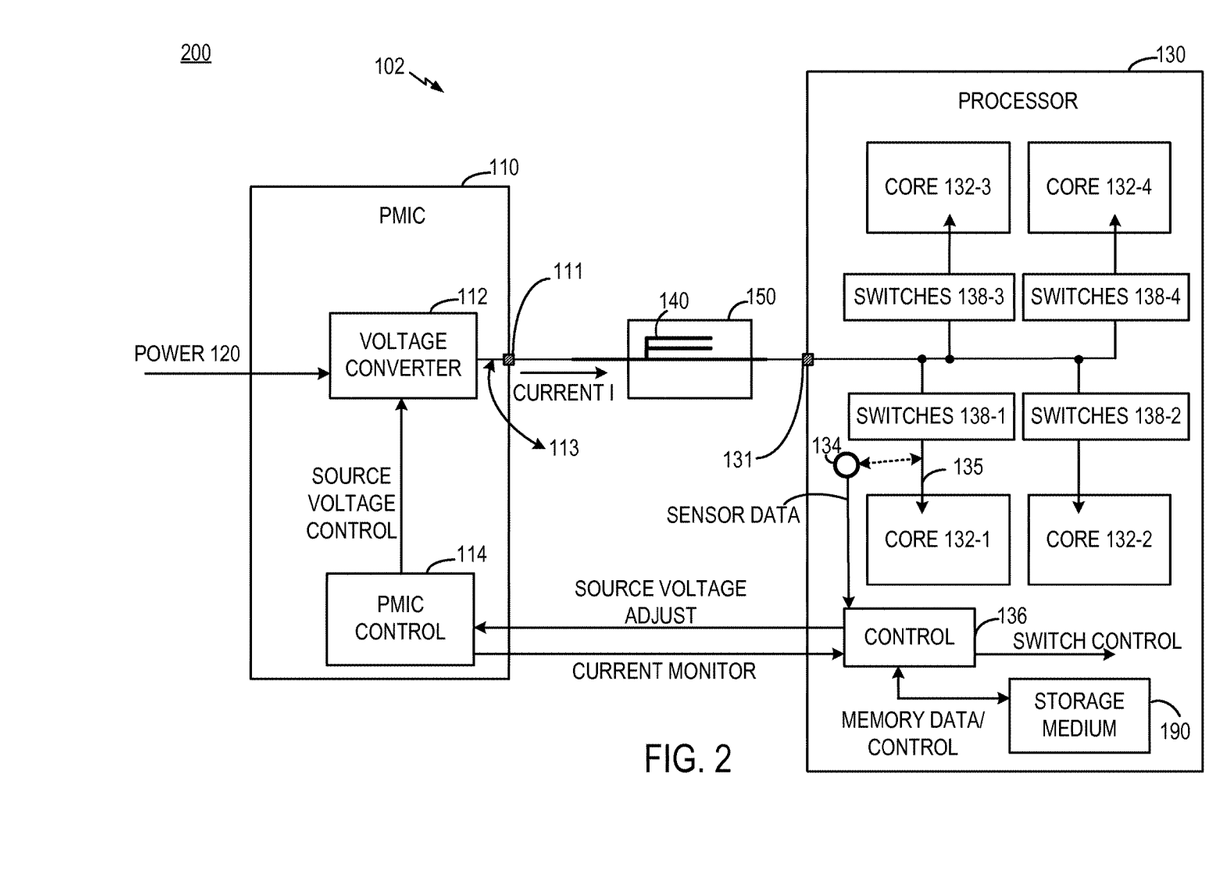
FIG. 2 is a functional block diagram of the apparatus of FIG. 1.

FIG. 2 is a functional block diagram 200 of the board 102 of FIG. 1. The PMIC 110 includes a voltage converter 112 controlled by the PMIC control 114. The voltage converter 112 may be a buck converter and/or a low-dropout regulator. The voltage converter 112 receives power 120 and outputs source voltage 113 to the processor 130 via the connector 111 of the PMIC 110, the PDN 150, and the connector 131 of the processor 130. Likewise, the PMIC 110 outputs current "I" to the PDN 150 via the connector 111. The source voltage 113 is set or adjusted by the SOURCE VOLTAGE CONTROL signal from the PMIC control 114.

The PDN 150 connects the connector 111 of the PMIC 110 and the connector 131 of the processor 130. The processor 130 may include cores 132 (132-1-132-4), a sensor 134, a control circuit 136, and switches 138 (138-1-138-4) via which the cores 132 receive operating voltages 135 (135-1-135-4). In some examples, a core may be a collection of circuit. In another example, a core may be a processor core or a central processing unit (CPU). Each of the cores 132 receives the respective operating voltage 135 from the PMIC 110 (the source voltage 113) via the connector 131.

In some examples, the sensor 134 and the control circuit 136 may be incorporated as part of one of the cores 132. In some other examples, the sensor 134 and the control circuit 136 may be external to the substrates of the processor 130. In some example, the sensor 134 (e.g., voltage sensor) monitors the operating voltage 135-1 of the core 132-1. Additional sensors (which are not shown for clarity) may be included to monitor each of the operating voltages 135-1-135-4. The sensor 134 outputs the sensor data to the control circuit 136. Based on the sensor data, the control circuit 136 outputs the SOURCE VOLTAGE ADJUST signal to the PMIC control 114 of the PMIC 110 to set or adjust the source voltage 113.

The control circuit 136 may further monitor currents I outputted by the PMIC 110 to the PDN 150. For example, the control circuit 136 may receive or monitor the CURRENT MONITOR signal from the PMIC 110. The board 102 may include the storage medium 190 (shown, as an example, as part of the processor 130). In some examples, the storage medium 190 is a non-volatile memory, such as blown fuses. The control circuit 136 may control or read/write data to the storage medium 190 via the MEMORY DATA/CONTROL signaling. In some examples, the storage medium 190 may include registers for storing values received from software. In some examples, the storage medium 190 may not be part of the processor 130. In these examples, the storage medium 190 may be computer readable medium storing those values.

Figure 3:
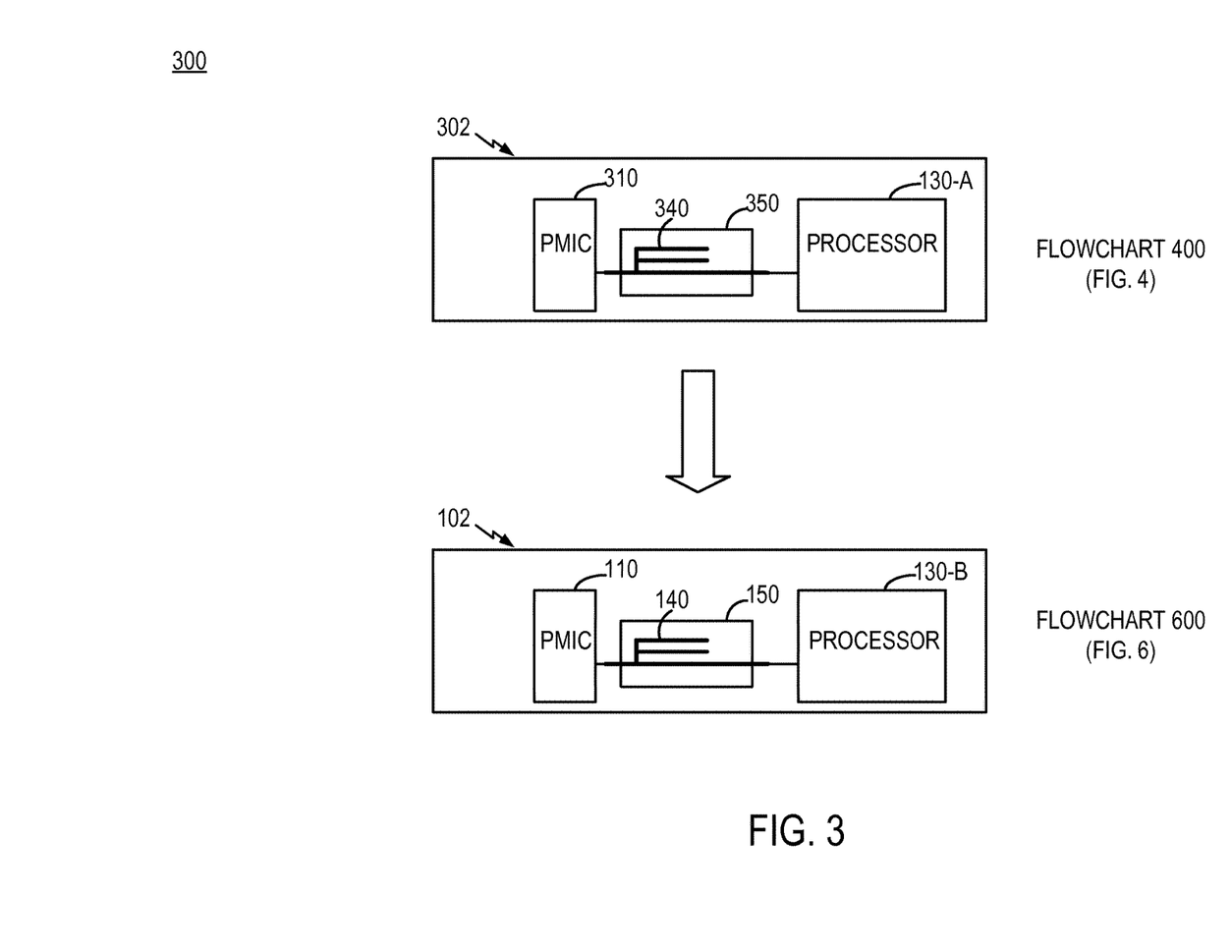
FIG. 3 is a conceptual diagram of boards incorporating exemplary embodiments for adjusting source voltage of a power source based on data stored in a storage medium.

FIG. 3 is a conceptual diagram 300 of boards incorporating exemplary embodiments for adjusting source voltage of a power source based on data stored in a storage medium. The board 302 may be a circuit board for a wireless communication device, such as a cell phone. In some examples, the board 302 may be a reference board with various known properties. The board 302 includes the processor 130-A powered by the power source PMIC 310 (e.g., assembled onto the board 302). The processor 130-A receives power from the PMIC 310 through the PDN 350.

The PDN 350 may include traces 340 on the board 302, and the traces 340 may be different from the traces 140 of the PDN 150. Thus, the electrical characteristics of the PDN 350 differ from those of the PDN 150. In some examples, the processor 130-A receives power from the PMIC 310 and interfaces with the PMIC (e.g., via the SOURCE VOLTAGE ADJUST signal and the CURRENT MONITOR signal) similar to that of the board 102 shown in FIG. 2. In some examples, the connections of the board 302 may differ from that of FIG. 2 in that the PDNs are different.

The performance of the PMIC 310 and the electrical characteristics of the PDN 350 may be known, since the board 302 is a reference board. Accordingly, the board 302 incorporating the PMIC 310 and the processor 130 may characterize electrical characteristics of the processor 130-A and store these electrical characteristics in the storage medium 190. These electrical characteristics of the processor 130-A are resulted from or responsive to the processor 130-A receiving power from the PMIC 310 through the PDN 350.

Figure 4:
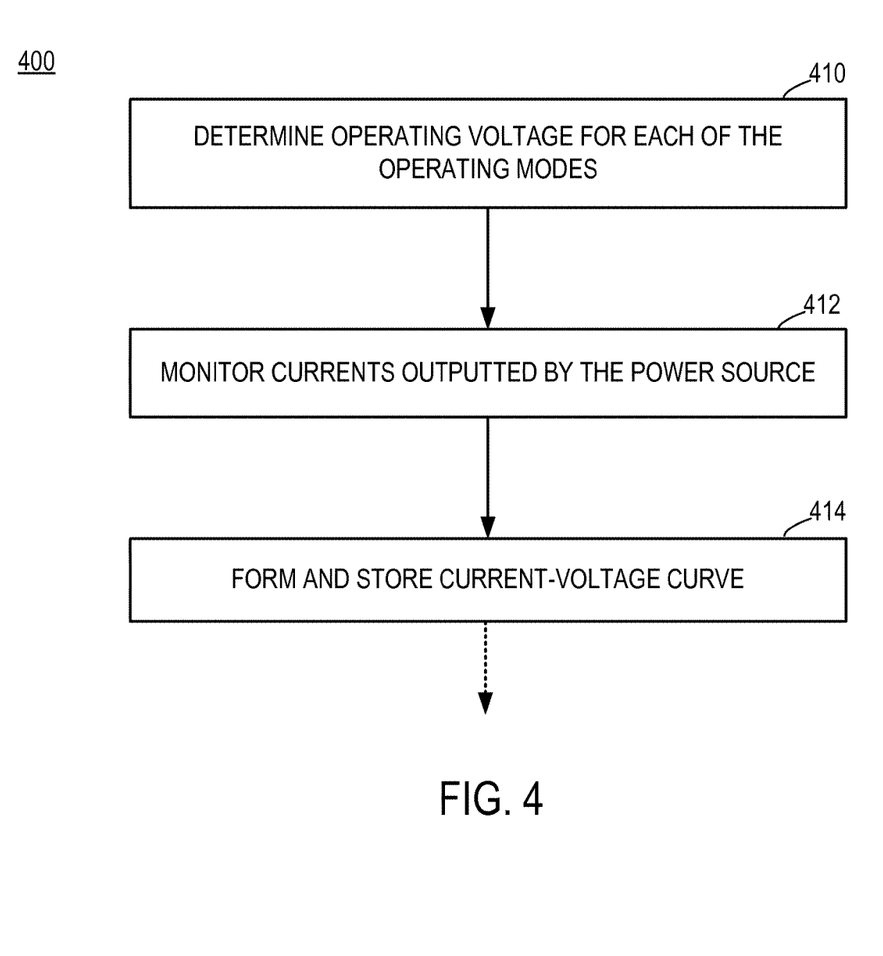
FIG. 4 is a flowchart of operations to obtain and store electrical characteristics of a processor.

In this regard, FIG. 4 is a flowchart 400 of operations to obtain and store electrical characteristics of a processor. Referring to FIG. 4, at 410, operating voltages for each of the operating modes of the processor 130-A are determined. In some examples, the processor 130-A may operate at various operating modes based on performance requirements. For example, the processor 130-A may operate at a data-retention mode having the lowest performance requirement (e.g., operating voltage), as the mode functions to retain data and has no particular performance concerns. The processor 130-A may in addition operate at the low-performance mode, the normal-performance mode, and the high-performance mode having increasingly higher performance and operating voltage demands. As persons of ordinary skill in the art would recognize, the operating modes may be based on other factors besides performance.

In some examples, the operating voltage thresholds for each of the operating modes may be determined. For example, the control circuit 136 may effect the operating voltage 135 of the processor 130-A in each of these operating modes to be lowered (e.g., using the SOURCE VOLTAGE ADJUST signal) until the performances of the processor 130 fails to meet the demand.

At 412, currents outputted by the power source may be monitored. In some examples, referring to FIG. 2, the control circuit 136 may monitor the current I outputted by the PMIC 310 for each of the operating modes by receiving the CURRENT MONITOR signal from the PMIC 310.

Figure 5:
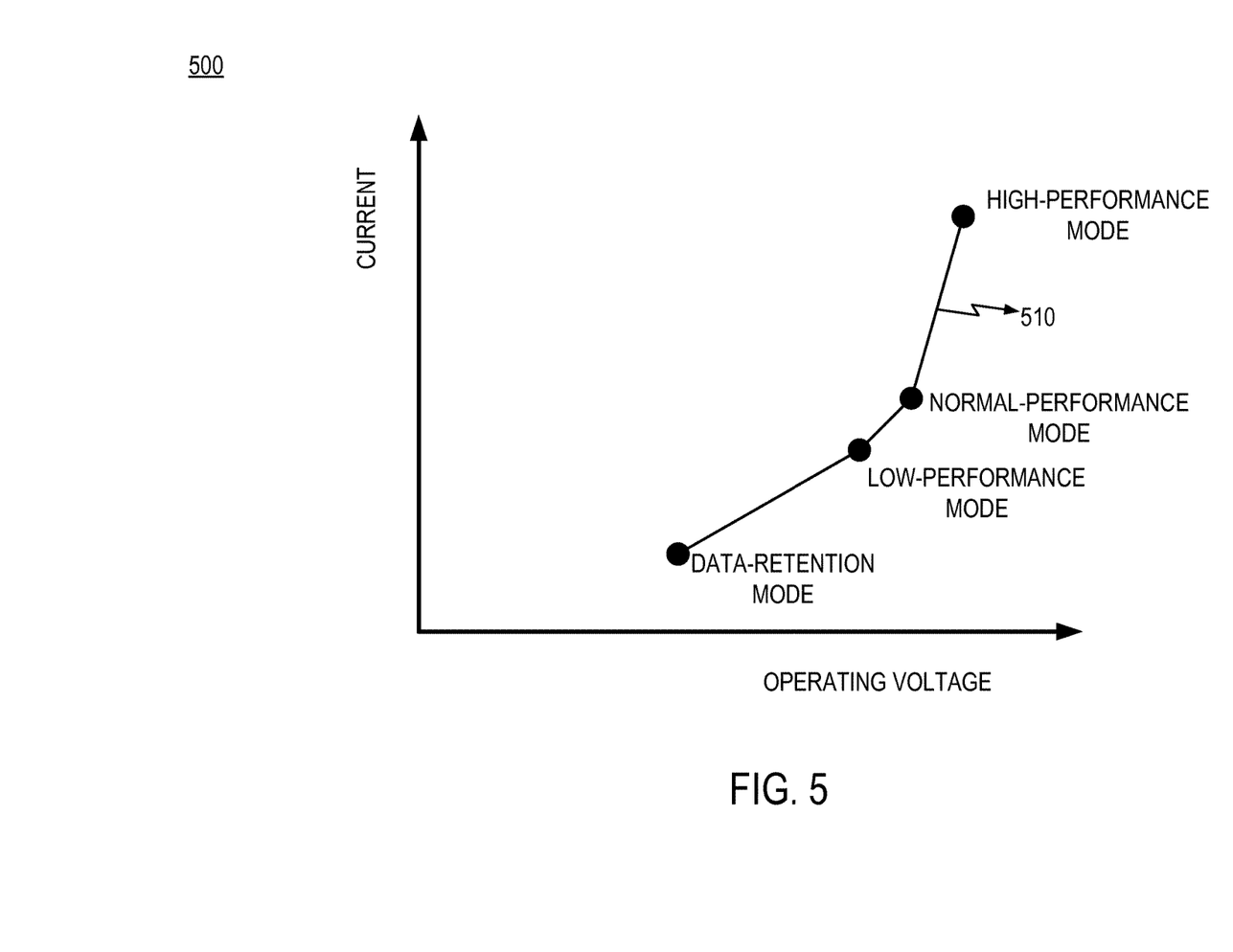
FIG. 5 is a diagram of an I-V curve of an exemplary embodiment of FIG. 3 stored in the storage medium.

At 414, a current-voltage curve (I-V curve) may be formed and stored in, for example, storage medium 190 of FIG. 2. Examples of the I-V curve may include relationships between the currents outputted by the PMIC 310 (step 412) and operating voltages 135 of the processor 130-A for the operating modes. FIG. 5 is a diagram 500 of an I-V curve of an exemplary embodiment of FIG. 3 stored in the storage medium. Referring to FIG. 5, the I-V curve 510 includes one or more relationships of the operating voltage 135 (e.g., an operating voltage threshold) and the corresponding current I outputted by the PMIC 310 for each of the operating modes.

In some examples, the control circuit 136 may cause the I-V curve 510 to be stored in a storage medium on the board 302.

Referring back to FIG. 3, subsequent to the operations of flowchart 400, the board 102 incorporates the PMIC 110, the PDN 150, and the processor 130-B. The board 102 may be utilized to operate the flowchart 600 of FIGS. 6A and 6B. In some examples, the processor 130-A and the processor 130-B may be the same processor. In some examples, the processor 130-A (operating the flowchart 400) and the processor 130-B (operating the flowchart 600) may be processors of the same type. Thus, the electrical characteristics of the processor 130-A obtained from the operations of the flowchart 400 (e.g., the I-V curve 510) are applicable to the processor 130-B. Moreover, the I-V curve 510 may be stored in the storage medium 190 of the processor 130-B. That is, the data stored in the storage medium of the board 302 may be copied to the storage medium 190 of the board 102. Thus, the storage medium 190 of the processor 130-B may store information indicating the operating voltages 135 received by the processor 130-B through the PDN 350 (from the PMIC 310) and the corresponding currents I outputted by the PMIC 310 to the PDN 350, as these electrical characteristics may be applied to the processor 130-B.

The board 102 may be, for example, a production board for a wireless communication device, such as a cell phone. Production boards are manufactured in volume and by different vendors and therefore, the exact electrical characteristics of the PDN 150 may not be known to the processor 130-B. The present disclosure provides exemplary embodiments to adjust the source voltage of the PMIC 110 based on the data stored in the storage medium 190 to account for the variations among the PDNs 150. In this fashion, the source voltage of the PMIC 110 may be tailored for the particularities of the each of the PDNs 150 to reduce excessive voltage margin and still provide a satisfactory voltage level for each of the operating modes.

Figure 6A:
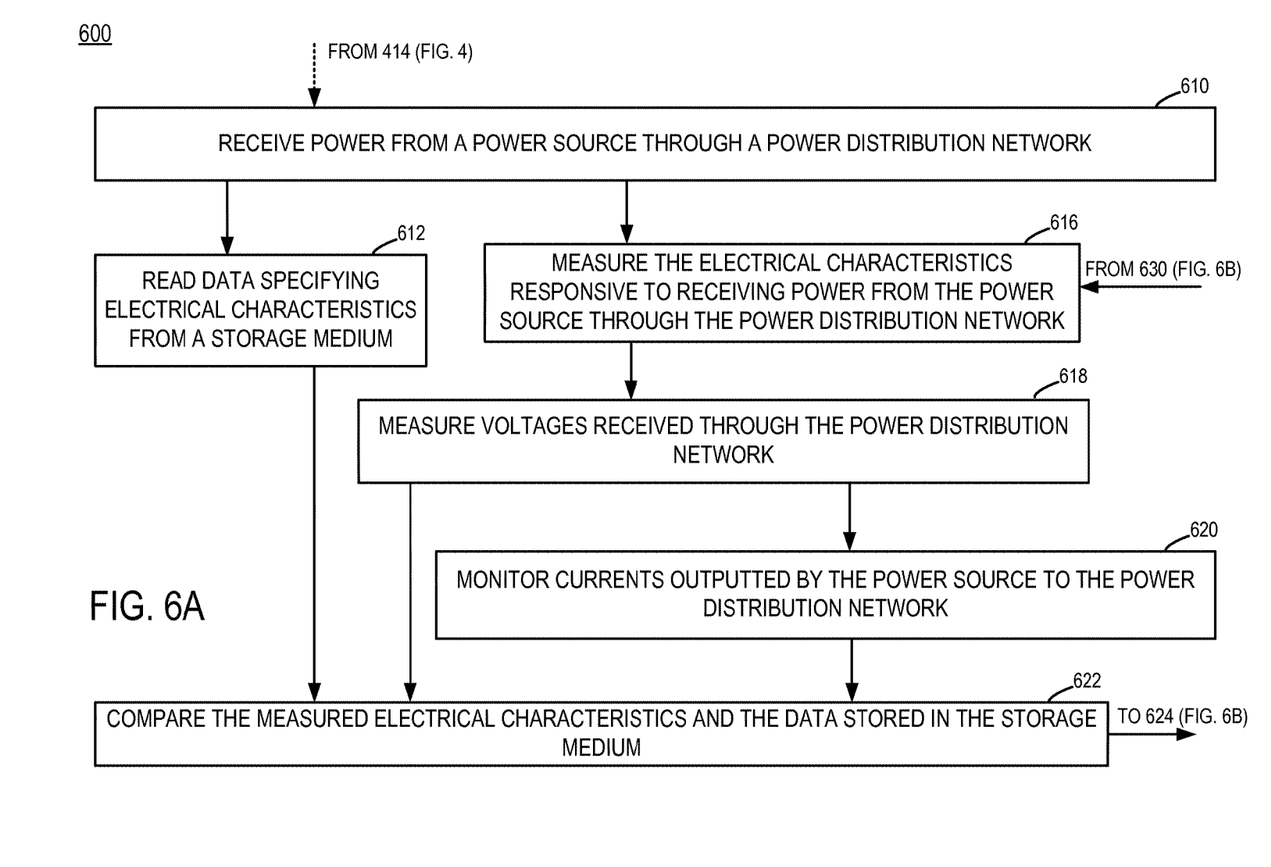
FIGS. 6A and 6B are a flowchart of operations to adjust the source voltage of a power source based on the data stored in the storage medium.
Figure 6B:
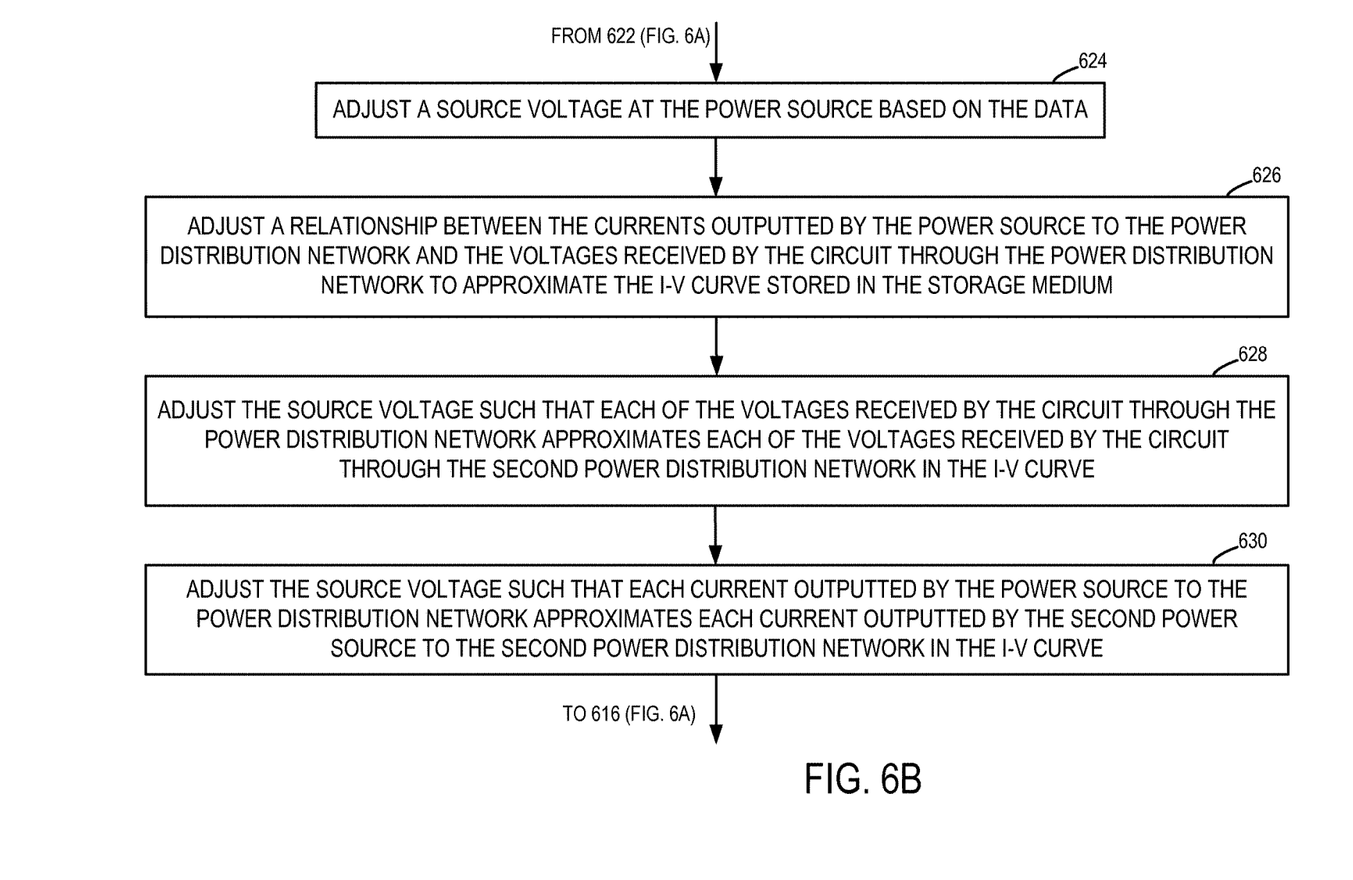

FIGS. 6A and 6B are a flowchart 600 of operations to adjust the source voltage of the power source based on the data stored in the storage medium. The operations of flowchart 600 may be performed by the processor 130 (e.g., the control circuit 136) described in FIG. 2 and the associated text. In some examples, the board 102 operates the flowchart 600. At 610, power is received through the power supply through the power distribution network. For example, the processor 130-B may receive power from the PMIC 110 through the PDN 150. Referring to FIG. 2, the cores 132 of the processor 130-B receive power from the PMIC 110 through the PDN 150.

AT 612, data specifying electrical characteristics are read from the storage medium. For example, the control circuit 136 may read the I-V curve 510 (e.g., data specifying one or more electrical characteristics of the processor 130-B) from the storage medium 190 via the MEMORY CONTROL/DATA signaling. As described above, the I-V curve 510 is applicable to the processor 130-B as, for example, information indicating the one or more electrical characteristics of the processor 130-B receiving power from the power source PMIC 310 through the PDN 350.

At 616, the electrical characteristics responsive to receiving power from the power source through the power distribution network are measured. For example, the one or more electrical characteristics of the processor 130-B responsive to receiving power from the power source PMIC 110 through the PDN 150 may be measured. Examples of the one or more electrical characteristics of the processor 130-B may include voltages applied at the processor 130-B resulting from the processor 130-B receiving power from the power source PMIC 110 through the PDN 150.

At 618, voltages received through the power distribution network are measured. Referring to FIG. 2, the sensor 134 measures the operating voltage 135 (e.g., voltages applied at the cores 132 of the processor 130-B) and provides the sensor data to the control circuit 136. In some examples, the control circuit 136 may measure the operating voltage 135 for each of the operating modes of the processor-B. At 620, currents outputted by the power source to the power distribution network are monitored. For example, the control circuit 136 may monitor the current I outputted by the PMIC 110 to the PDN 150. In some examples, the current I may be monitored for each of the operating modes of the processor 130.

At 622, the measured electrical characteristics and the data stored in the storage medium are compared. For example, the control circuit 136 receives the sensor data from the sensor 134 and compares the measured operating voltage 135 with the I-V curve 510 read from the storage medium 190. At 624, a source voltage at the power source is adjusted based on the data. For example, the control circuit 136 may adjust the source voltage 113 based on the I-V curve 510 stored in the storage medium 190. Additional features of this adjustment are described with steps 626, 628, and 630 presented below.

At 626, a relationship between the currents outputted by the power source to the power distribution network and the voltages received by the circuit through the power distribution network are adjusted to approximate the current-voltage curve stored in the storage medium, for each operating mode. For example, an I-V curve of the board 102 may be formed based on a relationship between the currents I outputted by the power source PMIC 110 to the PDN 150 and the operating voltages 135 received by the processor 130-B through the PDN 150 (e.g., for the operating modes of the processor 130-B).

Figure 7:
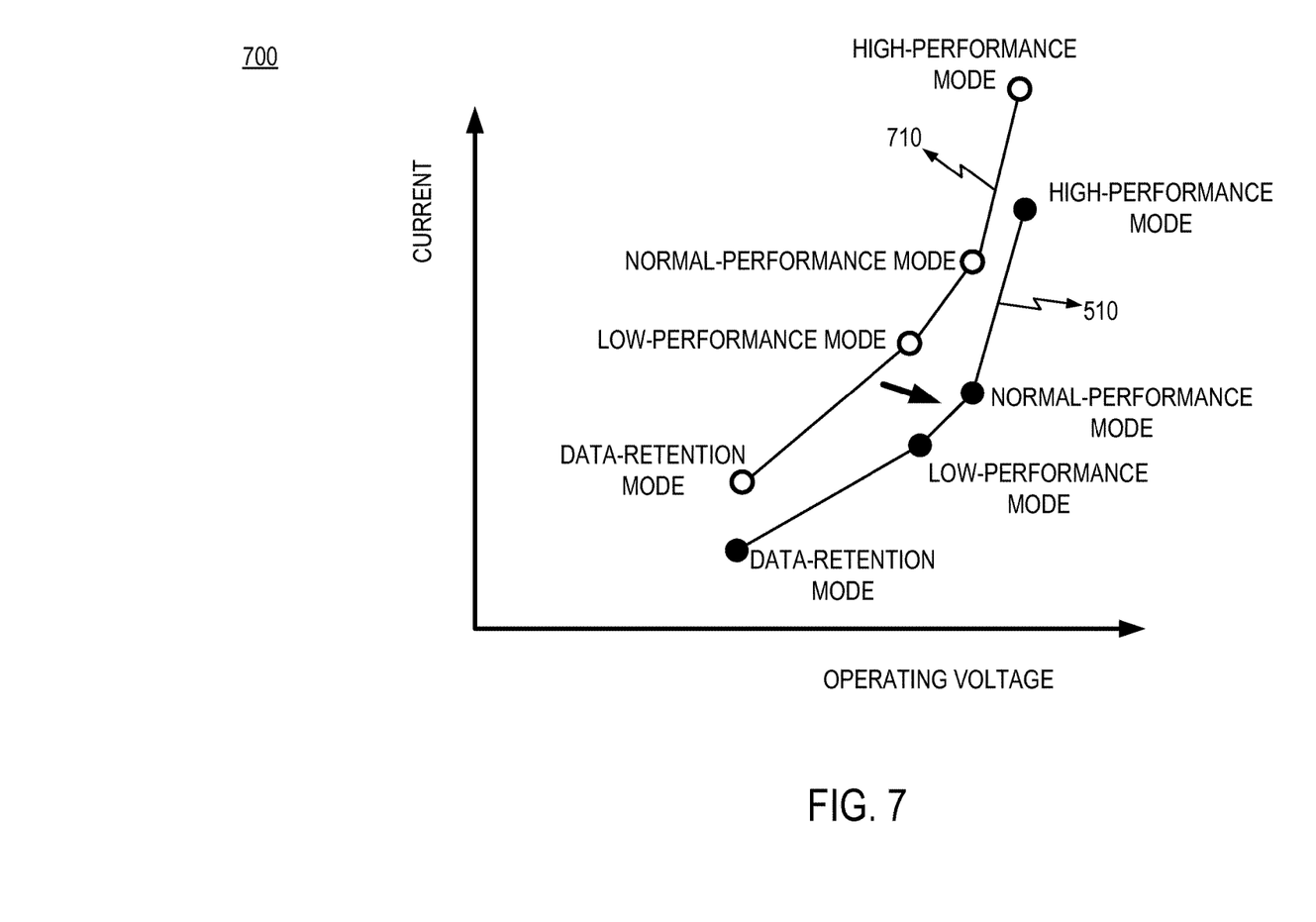
FIG. 7 is a diagram of adjusting the source voltage of the power source to approximate the I-V curve stored in the storage medium.

An example of the adjustment is shown in FIG. 7. FIG. 7 is a diagram 700 of adjusting the source voltage of the power source to approximate the I-V curve stored in the storage medium. The diagram 700 includes an I-V curve 710 of the board 102 and the I-V curve 510 of the board 302 (stored in the storage medium 190 of the board 102). As illustrated, the I-V curve 710 includes the relationships of the currents I outputted by the PMIC 110 to the PDN 150 and the corresponding operating voltages 135 received by the processor 130-B, for each of the operating modes of the processor 130-B. For example, the operating modes may include the data-retention mode, the low-performance mode, the normal-performance mode, and the high-performance mode, etc.

In some examples, the control circuit 136 may adjust the I-V curve 710 of the board 102 to approximate the I-V curve 510 of the board 302 stored in the storage medium 190. For example, the control circuit 136 may fit the I-V curve 710 of the board 102 to the I-V curve 510 using curve-fitting schemes known to persons of ordinary skill in the art. As presented above, the stored I-V curve 510 is based on characterization of the processor 130-A incorporated in the board 302. Since the processor 130-A and the processor 130-B are the same type, the stored I-V curve 510 may be applicable as information indicating the one or more electrical characteristics of the processor 130-B responsive to receiving power from the power source PMIC 310 through the PDN 350 (e.g., the operating voltages received by the processor 130-B, the associated currents outputted by the PMIC 310 to the PDN 350). The curve-fitting may be subject to certain constraints, and examples of which are presented with 628 and 630. In such fashion, the selected source voltage setting at the PMIC 110 is tailored for each PDN 150, and the voltage margin provided for the operating voltage 135, due to tailoring of the PDN 150, may be reduced accordingly.

At 628, the source voltage is adjusted such that each of the voltages received by the circuit through the power distribution network approximates each of the voltages received by the circuit through the second power distribution network in the current-voltage curve stored in the storage medium, for each of the operating modes. For example, referring to FIG. 7, the control circuit 136 may adjust the source voltage 113 at the PMIC 110 in the board 102. The adjustments provide that each operating voltage 135 received by the processor 130-B through the PDN 150 approximates (e.g., as close as possible without being less than) each operating voltage of the I-V curve 510. As described above, the I-V curve 510 stored in the storage medium 190 may be information indicating relationships between operating voltages received by the processor 130-B from the PMIC 310 through the PDN 350 and the corresponding currents I outputted by the PMIC 310 to the PDN 350. The adjustment may be performed for each of the operating modes (e.g., data-retention mode, low-power mode, etc.).

At 630, the source voltage is adjusted such that each current outputted by the power source to the power distribution network approximates each current outputted by the second power source to the second power distribution network in the current-voltage curve stored in the storage medium, for each of the operating modes. For example, referring to FIG. 7, the control circuit 136 may adjust the source voltage 113 at the PMIC 110 in the board 102. The adjustments provide that each current I outputted by the PMIC 110 to the PDN 150 approximates (e.g., as close as possible without being less than) each of the currents of the I-V curve 510. The adjustment may be performed for each of the operating modes (e.g., data-retention mode, low-power mode, etc.). The flow may return to 616 (FIG. 6A) to measure and obtain the received operating voltage 135 and the outputted currents I in response to the adjusted source voltage setting at the PMIC 110.

Figure 8:
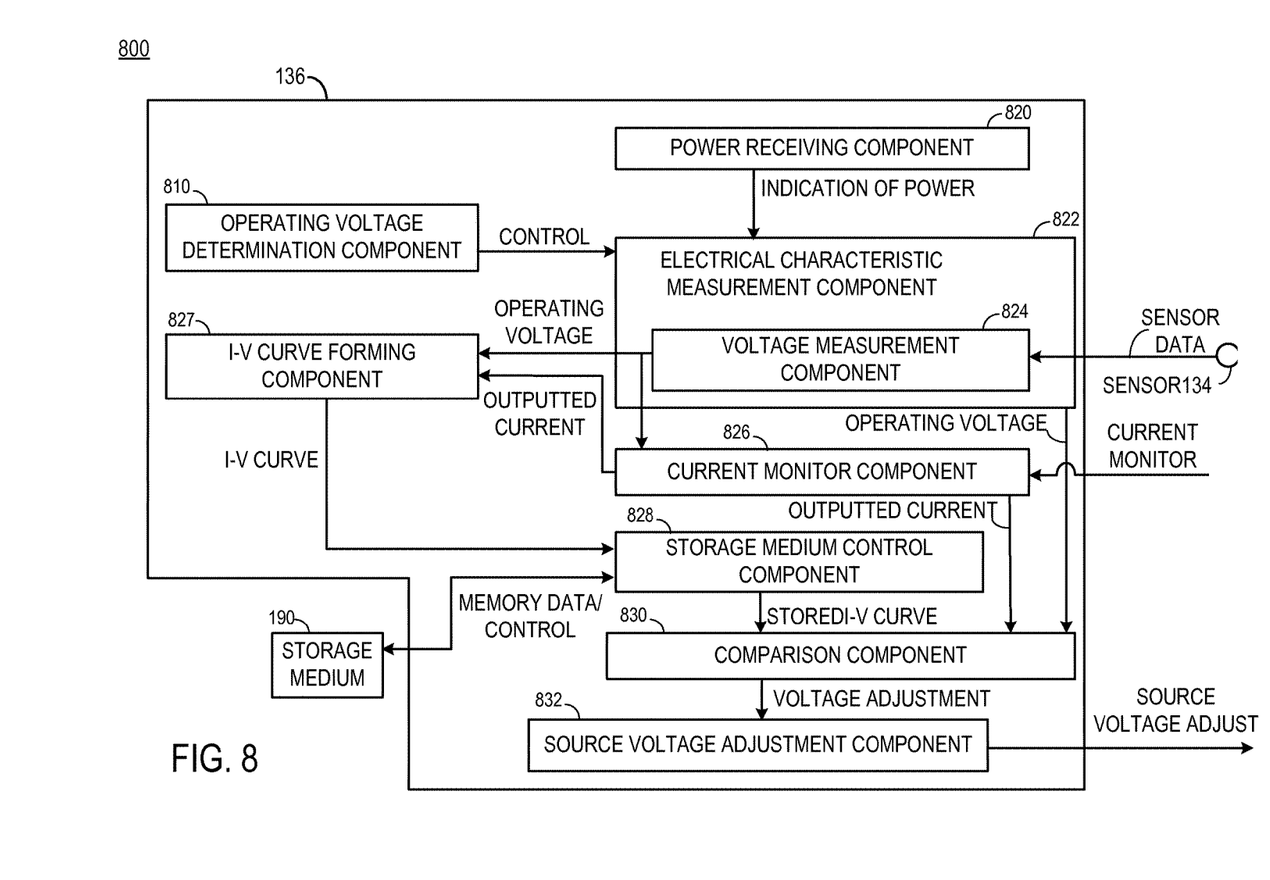
FIG. 8 is a block diagram of an exemplary embodiment of a control circuit

FIG. 8 is a block diagram 800 of an exemplary embodiment of a control circuit 136. The control circuit 136 may be an exemplary embodiment of a hardware implementation of the control circuit and may include various (e.g., hardware and/or software) components. The control circuit 136 may be part of processor 130-A (or 130-B) or external to the processor 130-A (or 130-B), either in whole or part. To the extent that the control circuit 136, or any portion thereof, is implemented external to the processor, it may be implemented in any part of the board 102 (or board 302) or external to the board 102 (or board 302). In some examples, each of the board 102 and 302 may include part or all of the components described below, as would be understood by persons of ordinary skill in the art.

In an exemplary embodiment, the control circuit 136 and the components contained therein, presented below, may include circuits, processor or processors, software executing on the processor or processors, or combinations thereof. These components may include circuits for generating the signals for the functions described infra or signal lines carrying those signals.

By way of example, a component, or any portion of a component, or any combination of components may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The control circuit 136 may include, in whole or in part, the operating voltage determination component 810, the power receiving component 820, the electrical characteristic measurement component 822, the voltage measurement component 824, the voltage measurement component 824, the current monitor component 826, the I-V curve forming component 827, and the storage medium control component 828, the comparison component 830, and the source voltage adjustment component 832.

In some examples, the board 302 may include the operating voltage determination component 810, the electrical characteristic measurement component 822, the voltage measurement component 824, the current monitor component 826, the I-V curve forming component 827, and the storage medium control component 828. Alternatively, the board 302 may include all or some additional components described above.

In reference to the board 302, the operating voltage determination component 810 may determine the desired operating voltages (e.g., operating voltage 135) for each of the operating modes of the processor 130-A (e.g., the data-retention mode, the low-performance mode, etc.). In some examples, the desired operating voltages are the operating voltage threshold for the operating modes. For example, the operating voltage determination component 810, for each of the operating modes, may lower the operating voltage 135 of the processor 130-A until the operating function fails.

The operating voltage determination component 810 may access or control the electrical characteristic measurement component 822 to obtain the operating voltage 135. For example, the electrical characteristic measurement component 822 may include the voltage measurement component 824. The sensor 134 senses the operating voltage 135 and provides the sensor data (e.g., the detected operating voltage 135) to the voltage measurement component 824.

The current monitor component 826 may monitor the current outputted from the power source. For example, in reference to the board 302, the current monitor component 826 receives the CURRENT MONITOR signal from the PMIC 310 indicating the current I outputted to the PDN 350.

The I-V curve forming component 827 may receive the operating voltage 135 from the electrical characteristic measurement component 822 and the outputted current I from the current monitor component 826. In response, the I-V curve forming component 827 may output data recognizing the relationship between the operating voltage 135 from the electrical characteristic and the outputted current I. For example, the I-V curve forming component 827 may generate an I-V curve table (e.g., I-V curve 510) storing the associated operating voltage 135 and the outputted current I for each operating modes. In another example, the I-V curve forming component 827 may provide the associated operating mode, the operating voltage 135, and the outputted current I to the storage medium control component 828 for storage in the storage medium of the board 302.

The storage medium control component 828 may receive the I-V curve (e.g., I-V curve 510) from the I-V curve forming component 827 and, via the MEMORY DATA/CONTROL signaling, effect the storage of the I-V curve in the storage medium of the board 302 (e.g., a memory of the processor 130-A).

In some examples, the board 102 may include the power receiving component 820, the electrical characteristic measurement component 822, the voltage measurement component 824, the current monitor component 826, the storage medium control component 828, the comparison component 830, and the source voltage adjustment component 832. Alternatively, the board 102 may include all or some additional components described above.

The power receiving component 820 may receive the operating voltage 135 from the PMIC 110 through the PDN 150. Referring to FIG. 2, for example, the power receiving component 820 may include components within the cores 132 coupled to the operating voltage 135 or configured to detect a presence of the operating voltage 135.

The electrical characteristic measurement component 822 may receive an indication of the receiving of power from the power receiving component 820. In response, the voltage measurement component 824 may read the sense data from the sensor 134. The sensor 134 senses the operating voltage 135 and provides the sensor data (e.g., the detected operating voltage 135) to the voltage measurement component 824.

The current monitor component 826 may monitor the current outputted from the power source. For example, in reference to the board 102, the current monitor component 826 receives the CURRENT MONITOR signal from the PMIC 110 indicating the current I outputted to the PDN 150. The storage medium control component 828 may, via the MEMORY DATA/CONTROL signaling, read the I-V curve 510 stored in the storage medium 190. In some examples, the storage medium 190 is a non-volatile memory, such as blown fuses. In some examples, the storage medium 190 may include registers for storing the I-V curves 510 received from software. In these examples, the storage medium 190 may be computer readable medium storing the I-V curves 510.

The comparison component 830 may receive the I-V curve 510 from the storage medium control component 828, the received operating voltages 135 from the electrical characteristic measurement component 822, and the corresponding outputted currents I from the current monitor component 826. The comparison component 830 may determine the relationship between the currents I outputted by the power source PMIC 110 to the PDN 150 and the operating voltages 135 received by the processor 130-B through the PDN 150 (e.g., I-V curve 710), and compare the relationship to the I-V curve 510. The comparison component 830 may determine an amount of source voltage to adjust based on the comparison. For example, referring to FIG. 7, the comparison component 830 may determine source voltage adjustments to adjust the measured operating voltages 135 and the outputted voltages I (e.g., I-V curve 710) to approximate the I-V curve 510 stored in the storage medium 190. In additional, the comparison component 830 may perform features described in 624, 626, and 628.

The source voltage adjustment component 832 receives the source voltage adjustment from the comparison component 830. The source voltage adjustment component 832 may effect the changes to the source voltage setting in the PMIC 110 via the SOURCE VOLTAGE ADJUST signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. For example, the steps may be implemented by circuits to perform the functions described herein and/or circuits generating the signals for the functions described herein, or combinations thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus, comprising:
a circuit configured to receive power from a power source through a power distribution network and to receive a plurality of voltages from a second power source through a second power distribution network, the plurality of voltages corresponding to threshold voltages of a plurality of operating modes of the circuit;
a voltage sensor configured to measure voltages received by the circuit through the power distribution network;
a storage medium storing data specifying one or more electrical characteristics of the circuit; and
a control circuit configured to monitor currents outputted by the power source to the power distribution network and to adjust a source voltage at the power source based on the data stored in the storage medium including a current-voltage curve stored in the storage medium, the control circuit further configured to adjust the source voltage at the power source such that a relationship between the currents outputted by the power source to the power distribution network and the voltages received by the circuit through the power distribution network approximates the current-voltage curve.

2. The apparatus of claim 1, further comprising;
at least one sensor including the voltage sensor configured to measure the one or more electrical characteristics of the circuit responsive to receiving power from the power source through the power distribution network, wherein the control circuit is further configured to compare the one or more measured electrical characteristics and the data stored in the storage medium and to adjust the source voltage at the power source based on the comparison.

3. The apparatus of claim 2, wherein the one or more electrical characteristics stored in the storage medium comprise a current-voltage curve.

4. The apparatus of claim 3, wherein the current-voltage curve comprises information indicating the plurality of voltages received by the circuit from the second power source through the second power distribution network.

5. The apparatus of claim 4, wherein the current-voltage curve further comprises information indicating each of a plurality of currents outputted by the second power source to the second power distribution network corresponding to each of the voltages received by the circuit from the second power source through the second power distribution network.

6. An apparatus, comprising:
a circuit configured to receive power from a power source through a power distribution network and to receive a plurality of voltages from a second power source through a second power distribution network, the plurality of voltages corresponding to threshold voltages of a plurality of operating modes of the circuit;
a voltage sensor configured to measure voltages received by the circuit through the power distribution network;
a storage medium storing data specifying one or more electrical characteristics of the circuit; and
a control circuit configured to monitor currents outputted by the power source to the power distribution network and to adjust a source voltage at the power source based on the data stored in the storage medium including a current-voltage curve stored in the storage medium, the control circuit further configured to adjust the source voltage such that each of the voltages received by the circuit through the power distribution network approximates each of the voltages received by the circuit from the second power source through the second power distribution network in the current-voltage curve stored, for each of the operating modes.

7. An apparatus, comprising:
a circuit configured to receive power from a power source through a power distribution network and to receive a plurality of voltages from a second power source through a second power distribution network, the plurality of voltages corresponding to threshold voltages of a plurality of operating modes of the circuit;
a voltage sensor configured to measure voltages received by the circuit through the power distribution network;
a storage medium storing data specifying one or more electrical characteristics of the circuit; and
a control circuit configured to monitor currents outputted by the power source to the power distribution network and to adjust a source voltage at the power source based on the data stored in the storage medium including a current-voltage curve stored in the storage medium, the control circuit further configured to adjust the source voltage such that each current outputted to the power distribution network approximates each current outputted by the second power source to the second power distribution network in the current-voltage curve, for each of the operating modes.

8. A method to adjust voltages applied to a circuit, comprising:
receiving power by the circuit from a power source through a power distribution network and to receive a plurality of voltages from a second power source through a second power distribution network, the plurality of voltages corresponding to threshold voltages of a plurality of operating modes of the circuit;
measuring voltages received by the circuit through the power distribution network;
reading data specifying one or more electrical characteristics of the circuit from a storage medium;
monitoring currents outputted by the power source to the power distribution network; and
adjusting a source voltage at the power source based on the data stored in the storage medium including a current-voltage curve stored in the storage medium, adjusting the source voltage at the power source further comprising adjusting a relationship between the currents outputted by the power source to the power distribution network and the voltages received by the circuit through the power distribution network to approximate the current-voltage curve stored in the storage medium.

9. The method of claim 8, further comprising;
measuring the one or more electrical characteristics including the voltages of the circuit responsive to receiving power from the power source through the power distribution network; and
comparing the one or more measured electrical characteristics and the data stored in the storage medium,
wherein the adjusting the source voltage at the power source is based on the comparison.

10. The method of claim 9, wherein the one or more electrical characteristics stored in the storage medium comprise a current-voltage curve.

11. The method of claim 10, wherein the current-voltage curve comprises information indicating the plurality of voltages received by the circuit from the second power source through the second power distribution network.

12. The method of claim 11, wherein the current-voltage curve further comprises information indicating each of a plurality of currents outputted by the second power source to the second power distribution network corresponding to each of the voltages received by the circuit from the second power source through the second power distribution network.

13. A method to adjust voltages applied to a circuit, comprising:
receiving power by the circuit from a power source through a power distribution network and to receive a plurality of voltages from a second power source through a second power distribution network, the plurality of voltages corresponding to threshold voltages of a plurality of operating modes of the circuit;
measuring voltages received by the circuit through the power distribution network;
reading data specifying one or more electrical characteristics of the circuit from a storage medium;
monitoring currents outputted by the power source to the power distribution network; and
adjusting a source voltage at the power source based on the data stored in the storage medium including a current-voltage curve stored in the storage medium, adjusting the source voltage at the power source further comprising adjusting the source voltage such that each of the voltages received by the circuit through the power distribution network approximates each of the voltages received by the circuit through the second power distribution network in the current-voltage curve stored in the storage medium, for each of the operating modes.

14. A method to adjust voltages applied to a circuit, comprising:
receiving power by the circuit from a power source through a power distribution network and to receive a plurality of voltages from a second power source through a second power distribution network, the plurality of voltages corresponding to threshold voltages of a plurality of operating modes of the circuit;
measuring voltages received by the circuit through the power distribution network;
reading data specifying one or more electrical characteristics of the circuit from a storage medium;
monitoring currents outputted by the power source to the power distribution network; and
adjusting a source voltage at the power source based on the data stored in the storage medium including a current-voltage curve stored in the storage medium, the adjusting the source voltage at the power source further comprising adjusting the source voltage such that each current outputted by the power source to the power distribution network approximates each current outputted by the second power source to the second power distribution network in the current-voltage curve stored in the storage medium, for each of the operating modes.

15. An apparatus, comprising:
a circuit configured to receive power from a power source through a first power distribution network and to receive a plurality of voltages from a second power source through a second power distribution network, the plurality of voltages corresponding to threshold voltages of a plurality of operating modes of the circuit;
a voltage sensor configured to measure voltages received by the circuit through the first power distribution network;
a storage medium storing data specifying one or more electrical characteristics of the circuit responsive to receiving power through a second power distribution network; and
a control circuit configured to monitor currents outputted by the power source to the first power distribution network and to adjust a source voltage at the power source based on the data stored in the storage medium and to adjust the source voltage at the power source based on a current-voltage curve stored in the storage medium such that a relationship between the currents outputted by the power source to the first power distribution network and the voltages received by the circuit through the first power distribution network approximates the current-voltage curve stored in the storage medium.

16. The apparatus of claim 15, wherein a current-voltage curve comprises information indicating the plurality of voltages received through the second power distribution network and information indicating each of a plurality of currents outputted by the second power source to the second power distribution network corresponding to each of the voltages received through the second power distribution network.

* * * * *